(12) United States Patent
Roy et al.

(10) Patent No.: US 8,625,578 B2
(45) Date of Patent: Jan. 7, 2014

(54) ACCESS INDEPENDENT COMMON ARCHITECTURE FOR REAL-TIME COMMUNICATIONS SERVICES FOR NETWORKING ENVIRONMENTS

(75) Inventors: Radhika R. Roy, Howell, NJ (US); Siroos K. Afshar, Manalapan, NJ (US); Marian R. Croak, Fair Haven, NJ (US); Enrique G. Cuevas, Holmdel, NJ (US); Alireza Faryar, Fair Haven, NJ (US); Steve Fisher, Morristown, NJ (US); Samuel Glazer, New York, NY (US); Barbara J. Kittredge, Brunswick, ME (US); Karen A. McGregor-Barnes, Manalapan, NJ (US); Magda K. Nassar, Red Bank, NJ (US); Larry Arnise Russell, Atlantic Highlands, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1091 days.

(21) Appl. No.: 11/927,112

(22) Filed: Oct. 29, 2007

(65) Prior Publication Data
US 2008/0056243 A1 Mar. 6, 2008

Related U.S. Application Data

(62) Division of application No. 10/748,707, filed on Dec. 30, 2003, now Pat. No. 7,797,459.

(60) Provisional application No. 60/446,448, filed on Feb. 11, 2003.

(51) Int. Cl.
*H04L 12/66* (2006.01)
*H04J 3/16* (2006.01)
*G06F 13/00* (2006.01)
*G06F 15/16* (2006.01)
*H04W 36/00* (2009.01)

(52) U.S. Cl.
USPC ........ 370/352; 370/465; 370/466; 379/93.05; 455/414.1; 455/432.2; 709/222; 709/246

(58) Field of Classification Search
USPC ......................... 370/352–356, 496, 465–467; 379/93.05–93.15, 100.13; 709/246–247, 222–224; 455/414.1–414.4, 432.2
See application file for complete search history.

(56) References Cited

U.S. PATENT DOCUMENTS 6,363,065 B1   3/2002 Thornton et al.
6,636,596 B1 * 10/2003 Gallant et al. ........... 379/220.01

(Continued)

OTHER PUBLICATIONS

"AT&T Common VoIP Architecture", White Paper, Oct. 2002, consists of 26 pages.

(Continued)

*Primary Examiner* — Asad Nawaz
*Assistant Examiner* — Wutchung Chu (57) ABSTRACT

An access architecture for real-time communications is described. The architecture includes an inter-architecture network utilizing a single protocol, a plurality of border elements in communication with the inter-architecture network and with an external network, and one or more call control elements in communication with said inter-architecture network. The external network utilizes any of a variety of known networking technologies and protocols. The inter-architecture network utilizes a single protocol such as SIP. The present architecture provides a single common infrastructure for offering real-time communications services independent of call control protocols and networking technologies.

5 Claims, 5 Drawing Sheets

(56) References Cited

U.S. PATENT DOCUMENTS

| | | | |
|---|---|---|---|
| 6,738,390 B1 * | 5/2004 | Xu et al. .................... 370/467 |
| 6,763,233 B2 * | 7/2004 | Bharatia ..................... 455/433 |
| 6,879,680 B2 * | 4/2005 | Donovan et al. ......... 379/220.01 |
| 6,904,035 B2 | 6/2005 | Requena |
| 6,940,847 B1 | 9/2005 | Glitho et al. |
| 6,940,862 B2 | 9/2005 | Goudreau |
| 6,963,583 B1 * | 11/2005 | Foti ............................ 370/467 |
| 7,002,989 B2 | 2/2006 | Agrawal et al. |
| 7,035,410 B1 | 4/2006 | Aiello et al. |
| 7,062,032 B1 | 6/2006 | Bloom et al. |
| 7,120,139 B1 | 10/2006 | Kung et al. |
| 7,139,263 B2 | 11/2006 | Miller et al. |
| 7,142,532 B2 * | 11/2006 | Penfield et al. ............. 370/352 |
| 7,177,646 B2 | 2/2007 | O'Neill et al. |
| 7,257,109 B2 * | 8/2007 | Sylvain ....................... 370/352 |
| 7,450,563 B2 * | 11/2008 | Cook et al. ................. 370/352 |
| 7,539,291 B2 | 5/2009 | D'Angelo et al. |
| 7,664,102 B1 * | 2/2010 | Samarasinghe .............. 370/352 |
| 7,797,459 B1 | 9/2010 | Roy et al. |
| 2002/0169883 A1 * | 11/2002 | Bright et al. ................ 709/230 |
| 2003/0211839 A1 | 11/2003 | Baum et al. |
| 2003/0224781 A1 * | 12/2003 | Milford et al. ............. 455/426.1 |
| 2003/0231626 A1 * | 12/2003 | Chuah et al. ............... 370/389 |
| 2004/0109414 A1 * | 6/2004 | Choi et al. .................. 370/230 |
| 2004/0202295 A1 * | 10/2004 | Shen et al. ............... 379/112.01 |
| 2004/0203664 A1 * | 10/2004 | Lei et al. .................... 455/414.1 |
| 2004/0215787 A1 * | 10/2004 | Gibson et al. ............... 709/227 |
| 2005/0169244 A1 * | 8/2005 | Luken ........................ 370/352 |
| 2005/0190721 A1 * | 9/2005 | Pershan ...................... 370/328 |
| 2006/0203732 A1 | 9/2006 | Covino et al. |
| 2007/0030843 A1 * | 2/2007 | Miller et al. ................ 370/352 |
| 2007/0237175 A1 | 10/2007 | Benedyk et al. |
| 2008/0049783 A1 * | 2/2008 | Habiby et al. .............. 370/466 |

OTHER PUBLICATIONS

Applegate et al., "Making Intra-domain Routing Robust to Changing and Uncertain Traffic Demands: Understanding Fundamental Tradeoffs," SIGCOMM '03, Aug. 25-29, 2003, Karlsruhe, Germany, 313-324.

* cited by examiner

ACCESS INDEPENDENT COMMON ARCHITECTURE FOR REAL-TIME COMMUNICATIONS SERVICES FOR NETWORKING ENVIRONMENTS

CROSS REFERENCE TO RELATED APPLICATIONS

This application is a Divisional of U.S. patent application Ser. No. 10/748,707 filed Dec. 30, 2003, now U.S. Pat. No. 7,797,459, which claims priority under 35 U.S.C. §119 (e) to provisional application Ser. No. 60/446,448 filed Feb. 11, 2003, where each of the above referenced applications is hereby incorporated by reference.

STATEMENT REGARDING FEDERALLY SPONSORED RESEARCH

Not Applicable.

FIELD OF THE INVENTION

The present invention relates generally to communications architecture and, more particularly, to a communications architecture that can be used as a single common infrastructure for offering real-time communications services independent of access call control protocols and access networking technologies.

BACKGROUND OF THE INVENTION

There currently exists several access networking technologies, with most of these networking technologies utilizing different call control protocols for access. More often than not, these access technologies and access call control protocols cannot communicate among themselves due to incompatibility among the architectures of the technologies. As a result it has proven difficult to achieve interoperability as well as scalability in a multi-protocol and a multi-vendor environment in order to build a large-scale network.

At present, real-time communications services like voice and multimedia (audio, video, and data) are provided using specific networking technologies that have their own call control services. However, there is no architecture that can be used as a single common infrastructure for offering real-time services.

SUMMARY OF THE INVENTION

A method and apparatus of a common architecture for providing real-time multimedia (audio, video, and/or data) services independent of access call control protocols and access networking technologies is presented. The common architecture includes an inter-architecture network utilizing a single protocol, a plurality of border elements in communication with the inter-architecture network and with an external network, and one or more call control elements in communication with said inter-architecture network. The external network, referred to as the access network, utilizes any of a variety of known access networking technologies and access call control protocols. The inter-architecture network utilizes a single protocol such as SIP. The present architecture thus provides a single common infrastructure for offering real-time communications services independent of call control protocols and networking technologies. The architecture further provides the mechanisms regarding how the common architecture handles real-time multimedia services regardless of the access call control protocols or the different access networking protocols. The common architecture provides not only interoperability, but also scalability in a multi-protocol and a multi-vendor environment in order to build a large-scale network.

BRIEF DESCRIPTION OF THE DRAWINGS

The invention will be more fully understood from the following detailed description taken in conjunction with the accompanying drawings, in which.

DETAILED DESCRIPTION OF THE INVENTION

The present invention comprises the detail mechanisms and ability of a common architecture for providing real-time communications services using a variety of media such as audio, video, and/or data among the communicating entities or parties, which may accommodate a variety of call control protocols for establishing the communicating session. The communicating entities may be using a variety of access networking technologies for connecting the external or access network to the common architecture described in this invention. The present invention comprises an architecture that provides a single common infrastructure for facilitating the development of real-time services with the highest quality and availability, the shortest possible time-to-market, and the lowest cost of operations and maintenance feasible as it does not require any change in access call control protocols and access networking technologies that the communicating parties may be using now or in the future.

Before describing the present invention, some introductory concepts and terminology are explained for the access networking technologies and access call control protocols.

Asynchronous Transfer Mode (ATM) is a network technology which utilizes cells or packets having a fixed packet or cell size. The cell or packet used in ATM allows the transmission of video, audio and computer data over the same network, and further assures that no particular data type has priority over another data type. ATM is typically offered in one of four service types. Constant bit rate (CBR) service requires a fixed rate of traffic such that data is sent in a steady stream. Variable Bit Rate (VBR) service provides a specified throughput capacity but the data is not necessarily provided in a steady stream as with CBR. VBR is commonly used for voice and videoconferencing data. Available Bit Rate (ABR) service provides a guaranteed maximum capacity but allows data to be transferred at higher capacities (referred to as bursted) when there is network capacity available. Unspecified Bit Rate (UBR) service does not provide a guaranteed throughput level. This is typically used for applications where delays can be tolerated, such as e-mail and file transfers.

Frame Relay (FR) defines a packet switching protocol for connecting devices in a Wide Area Network (WAN). FR networks support data transfer rates at T-1 speeds (1.544 Mbps) and at T-3 speeds (45 Mbps).

Internet Protocol (IP) specifies the format of packets and the addressing scheme used with the packets. Typically the IP format and addressing scheme is combined with a higher-level protocol to establish a virtual connection between a destination and a source.

Local area network (LAN) using carrier sense multiple access with collision detection (CSMA/CD), token ring, or other protocols may be connected to the access network or WAN supporting data transfer rate of multi-gigabit rates per second to terabit rates per second.

Public Switched Telephone Network (PSTN) refers to the telephone system using copper wires carrying analog voice data.

Time Division Multiplexing (TDM) refers to a type of multiplexing that combines data streams by assigning each data stream a different time division slot in a set of slots. TDM transmits a fixed sequence of slots over a single channel.

The access networking technologies described above such as ATM, FR, IP, LAN, and TDM may be used by the communicating entities for connecting themselves to the Common Architecture described in this invention.

H.323 is a standard for the call control protocol used over the packet-switched network that defines audiovisual conferencing data and how this data is transmitted across networks. H.323 allows users to participate in the same conference even though the participants are in different locations and may be utilizing different videoconferencing applications.

Session Initiated Protocol (SIP), another call control protocol used over the packet-switched network, comprises a signaling protocol for Internet conferencing, telephony, event notification and instant messaging. SIP initiates call setup, routing, authentication and other messages to endpoints within an IP domain.

ISDN User Part (ISUP), a call control protocol used over the TDM network, defines a protocol used to set up, manage, and release trunk circuits that carry voice and data calls over the PSTN.

Synchronous Optical Network (SONET) comprises a standard for connecting fiber-optic transmission systems. This is known as the physical layer technology on which other higher layer protocols are used.

Hyper Text Transfer Protocol (HTTP) is the protocol used by the World Wide Web for defining how messages are formatted and transmitted, and what actions web servers and browsers take in response to various commands. When a URL is entered into a web browser, an HTTP command is sent to the web server directing the web server to retrieve and transmit the requested web page. This is known as the application layer technology.

Simple Mail Protocol (SMTP) is a protocol used for transporting e-mail messages between servers. Most e-mail systems that send e-mail over the Internet utilize SMTP to send the messages from one server to another. This is also known as the application layer technology.

MultiProtocol Label Switching (MPLS) integrates Layer 2 information about network links (i.e., bandwidth, latency, and utilization) into Layer 3 (IP) within a system or service provider in order to simplify and improve packet exchange.

Signaling System 7 (SS7) is a telecommunications protocol used to offload PSTN data traffic congestion onto a wireless or broadband network. ISUP being a family of protocols of SS7 is used for basic call setup, management and tear down; wireless services such as personal communication service (PCS), wireless roaming, and mobile subscriber authentication; local number portability (LNP); toll free and toll call services; enhanced call features such as call forwarding, calling party name/number display, and three way calling; and efficient and secure worldwide transmission.

Voice over Internet Protocol (VoIP) that may use H.323, SIP, MEGACO, MGCP, or other call control protocol, is a technology that allows people to send and receive voice, fax and data information over a combination of a phone network and a digital communications network. In a VoIP environment, an analog voice stream is converted into digital packets by a gateway. The packets are transferred across a digital communications network, where another gateway converts the digital packets back into an analog voice stream.

Media Gateway Control (MEGACO), a kind of another call control protocol used between the TDM-Packet capable devices and the call signaling entity, is a standard that enables voice, fax and multimedia calls to be switched between the public switched telephone network and IP networks.

Media Gateway Control Protocol (MGCP), also a kind of another call control protocol used between the TDM-Packet capable devices and the call signaling entity, is a protocol for the control of VoIP calls by external call control elements. MGCP is implemented in call agents that issue commands to and receive event reports from gateways.

Network Address Translation (NAT) provides the ability to conceal a device such as a computer from outside users. Most often, NAT is configured so the internal network is mapped to an outside address and the incoming requests are converted to local IP addresses. Since each request must go through a translation process, it must be qualified or authenticated before it is received or sent.

Figure 1:
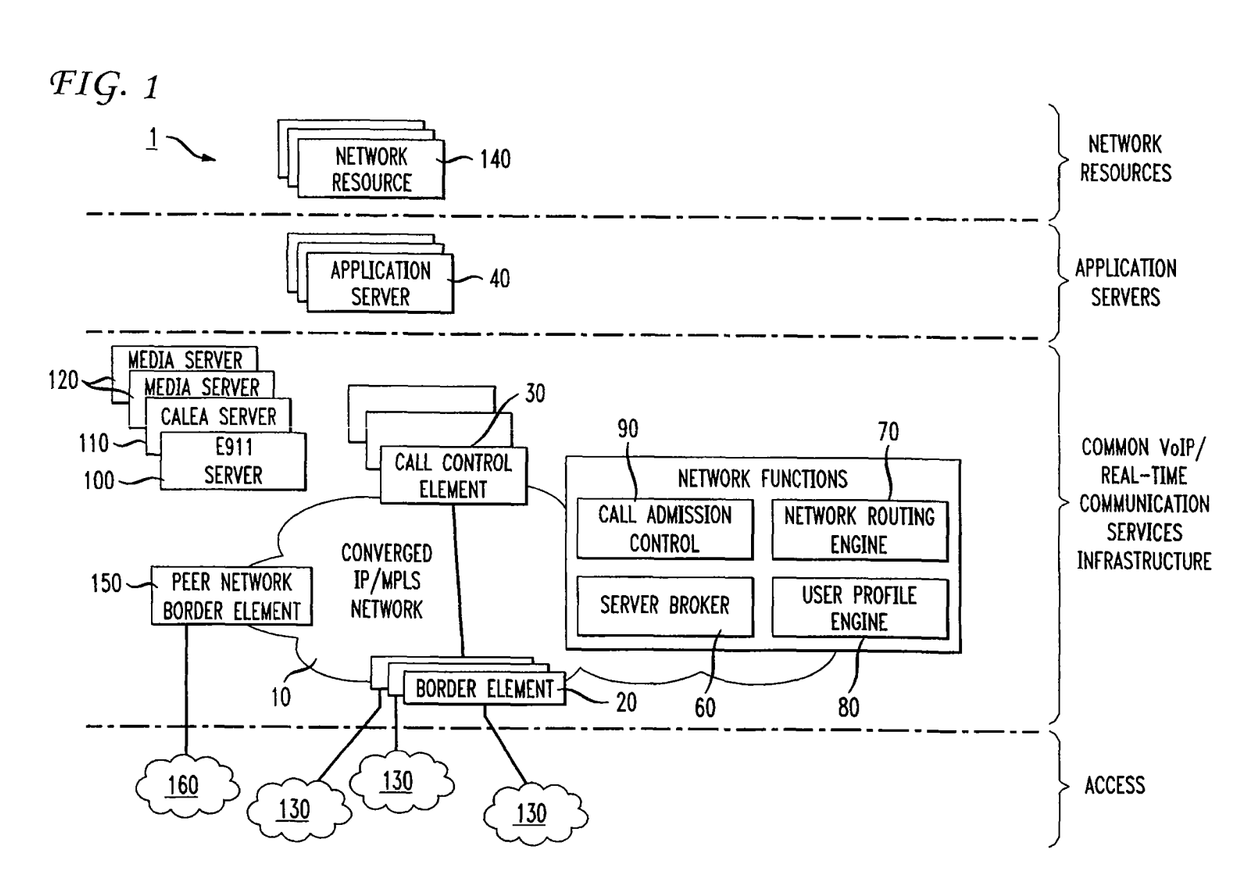
FIG. 1 is a block diagram of the Common VoIP/Real-Time communication services infrastructure of the present invention.

Referring now to FIG. 1, the VoIP/Real-Time Communications Services functional architecture 1 is shown. The architecture 1 is built as a virtual network on top of a Converged IP/MPLS Core Network 10. The Common VoIP/Real-Time Communications Services Infrastructure Architecture includes several functional entities including border elements (BEs) 20, call control elements (CCEs) 30, and media servers (MSs) 120. The architecture also includes common network functional entities such as a service broker (SB) 60, a network routing engine (NRE) 70, a user profile engine (UPE) 80, a call admission control (CAC) element 90, an Emergency 911 (E-911) server 100, and a Communications Assistance for Law Enforcement Act (CALEA) server 110.

The Core Network 10 is surrounded by one or more Multi-Service Access (MSA)/Multi-Service Edge (MSE) networks 130 that supports all popular access technologies including TDM, ATM, FR, and Ethernet. Each MSA/MSE network has access to the IP/MPLS network 10 by way of respective BEs 20. Thus, the common infrastructure can be reached via any of these access technologies. Moreover, the architecture provides capabilities to support various access protocols such as H.323, MGCP, MEGACO, SIP, TDM/SS7, as well as VoIP/Real-time Services protocol. This is achieved by surrounding the common infrastructure with Border Elements (BEs) 20, which mark the boundaries of the VoIP Infrastructure and translate the specifics of various access call control protocols into Session Initiation Protocol (SIP)—the single common internal protocol used by all common infrastructure components. The BEs 20 not only provide protocol conversion, but also enforce various policies including those needed for call admission control (CAC) and VoIP/Real-time Services Call Control-level security.

A BE 20 provides several functions including signaling, media control, security and call admission control. A BE proxies both the caller and the called end-points, thereby providing a point of signaling control at the edge of the network. The BE 20 translates the access protocol (H.323, MGCP, MEGACO, SS7, CAS, ISDN, etc.) to and from SIP. A BE 20 also examines all media streams going in and out of the Connectivity Layer for security, media format conversion, and media transfer. Additionally, the BE 20 redirects media streams upon request from the CCE without impacting the actual caller and called party, and provides the means for the CCE to define, detect and report DTMF strings during the call. A BE also provides all necessary security and screening for the customer sites it interacts with. It authenticates subscribers, customers, and partners, and provides NAT and firewall functions as appropriate. Furthermore, the BE uploads local policy information via policy protocol or Operations Support, and keeps track of resources for access networks.

A peer network border element 150 is also shown in FIG. 1. The peer network border element comprises a border element that is in communication with the core network and also in communication with another network 160. A BE 20 communicates within a company's networks, for example, within AT&T networks, whereas a peer network border element 150 communicates between a company's network and an external company's network, e.g. between an AT&T network and an MCI network.

The Call Control Element (CCE) 30 controls and manages the common infrastructure and provides a single interface to Application Servers (AS) 40 residing in the Applications Layer. Working with various BEs 20, the CCE 30 creates, removes, and joins call legs to establish connectivity between endpoints. The application servers 40 residing in the Applications Layer provide the service logic capabilities to implement various types of services. The addition of various services (e.g., billing or security) can be included without impacting the common infrastructure of the real-time services. To provide a service, the CCE 30 invokes an AS 40, using SIP to communicate. By sharing a common architecture, new access technologies can use existing and future ASs, and new ASs can support existing and future access technologies. This architecture supports real-time communications scenarios, like prepaid card, click-to-chat, and teleconferencing functionality.

Some services require the ability for the AS 40 to detect a signal that does not need to be on the media path (e.g. DTMF, flash hook). For example, a prepaid card application may permit the caller to enter a sequence of digits. This forces a hang-up of the destination and provides the opportunity for another call to be placed. To enable efficient utilization of network resources 140, the BE will allow an AS to register event triggers via the CCE, and the BE will signal the AS when the event occurs.

The Service Broker (SB) 60 maintains subscribers' service information from a database of installed and activated services. This database can be shared with other functional entities, such as the NRE and the UPE. The SB acts as the SIP Redirect server and provides tables that define the services subscribed by each individual user.

The Network Routing Engine (NRE) 70 provides the route information, upon finding which BE was used previously. This route information is required to set up the call leg between the source and destination BEs. Session Initiation Protocol (SIP) is used between the CCE and the NRE, with the NRE acting as the SIP Redirect server.

The Call Admission Control (CAC) element 90, engaged at the time of call setup, considers network-wide conditions and policies. The CAC 90 manages capacity, controls congestion, observes firewall restrictions, and interprets Service Level Agreement (SLA), Quality of Service (QoS) policies, Network Address Translation (NAT), and security policies.

The User Profile Engine (UPE) 80 is a functional entity that keeps both static and dynamic user profiles. The UPE consists of a SW Registrar which is used to set registry keys, import and export registry keys, and also sets permissions and ownership. The UPE may further include a Presence Server which is used to keep track of the status of a set of users, for example for Instant Messaging applications. The Presence Server, along with the NRE, share the same logical database. Access to the UPE 80 is controlled by the CCE for registration and presence information, using SIP signaling messages.

Media Servers (MS) 120 typically operate with ASs 40 to handle and terminate media streams, and to provide services such as announcements, bridges, transcoding, and Interactive Voice Response (IVR) messages. Using SIP to communicate, the AS 40 sends an invite to the MS, via the CCE, setting up the call and specifying the script the MS executes or the function it performs. The MS returns the status and results to the AS via HTTP posts.

The CALEA Server 110 provides the ability to identify and collect content of voice telephone calls traversing the VoIP network, as mandated by the Communications Assistance for Law Enforcement Act (CALEA). When a CCE 30 detects that a call needs to be monitored for legal reasons, it sets up the call via the CALEA server.

The E-911 Server 100 routes calls to the appropriate Public Safety Answering Points (PSAPs) based on the caller's location. When the CCE receives an emergency 911 call, it sends the call to the E-911 server and ensures that call waiting is disabled for the duration of the call.

An important criteria of the common infrastructure is that there can be many CCEs, BEs, and MSs across the whole network, however there is preferably only one of each of the following logically centralized servers: SB, NRE, UPE, CAC, E-911, and CALEA. The SB, NRE, CAC, E-911, and CALEA server can be physically distributed to have the desired reliability and performance criteria throughout the entire network that spans the entire world.

The BEs 20 interface with customer equipment within network 130 and provide customer connectivity using access-specific protocols. Different BEs 20 can be connected to different networks 130, with each of networks 130 which may be common to same or different protocols. The IP/MPLS Core Network provides IP connectivity for all elements of the VoIP infrastructure. Each application server 40 provides one or more services. The network resources 140 provide an environment for the creation of service logic and the management of services including customer record maintenance and billing plans.

The common VoIP/real-time communications services infrastructure of the present invention has several functional characteristics that make the architecture unique. The architecture provides for separation of service intelligence from call control with the help of SB. There exists an independence of call control from access technologies using BEs. There is also a separation of signaling and media as the common infrastructure entities (CCEs, Network Function Elements, etc.) handle media for communications among themselves. The BEs and MSs handle media for communications with the endpoints.

Additional functional characteristics of the present architecture include use of a plug-in paradigm for application servers as the common infrastructure functional entities are service agnostics. Another functional characteristic of the present architecture is the use of SIP for all internal signaling among the common infrastructure functional entities. The architecture additionally features physically distributed call admission control with a logically centralized component, and a centralized user profile engine for location and presence information. The architecture also utilizes standard modern protocols.

The access independent common architecture comprising CCE, BEs, MSs, SB, NRE, UPE, CAC, E-911, and CALEA functional entities provides the VoIP/Real-Time Communications Services infrastructure needed to process basic calls, support high performance network functions, send network primitives, provide media services, CALEA services, emergency services, interact with Application Servers for more advanced calls, and support Call Detail Recording.

As described above, the BEs translate the access protocol to SIP making the common infrastructure independent of any access call control protocols (e.g., SIP, H.323, ISUP/SS7) and networking technologies (e.g., IP, Ethernet, TDM, FR, ATM). Accordingly, the same Common VoIP/Real-Time Communications Services infrastructure handles calls and provides services for all networking environments (e.g., PSTN-PSTN, PSTN-IP, and IP-IP) and call control communications protocols (e.g., ISUP-ISUP, SIP-SIP, H.323-H.323, SIP-ISUP, H.323-ISUP, SIP-H.323). All calls for the PSTN-PSTN, PSTN-IP, or IP-IP are served by the common infrastructure comprising CCEs, BEs, and MSs, SB, NRE, CAC, E-911, and CALEA as appropriate.

The VoIP/Real-Time Communications Services Infrastructure provides all network primitives needed for applications to implement services. This includes establishing simple connectivity between endpoints by providing capabilities to create, join, remove (tear down) and report the status of call legs. The services that are also enabled in this layer are: Basic media services, E-911, CALEA and Call Detail Recording. The VoIP/Real-Time Communications Services Infrastructure provides a unified, shared environment that supports the addition of new services and access technologies without changing the basic infrastructure.

Figure 2:
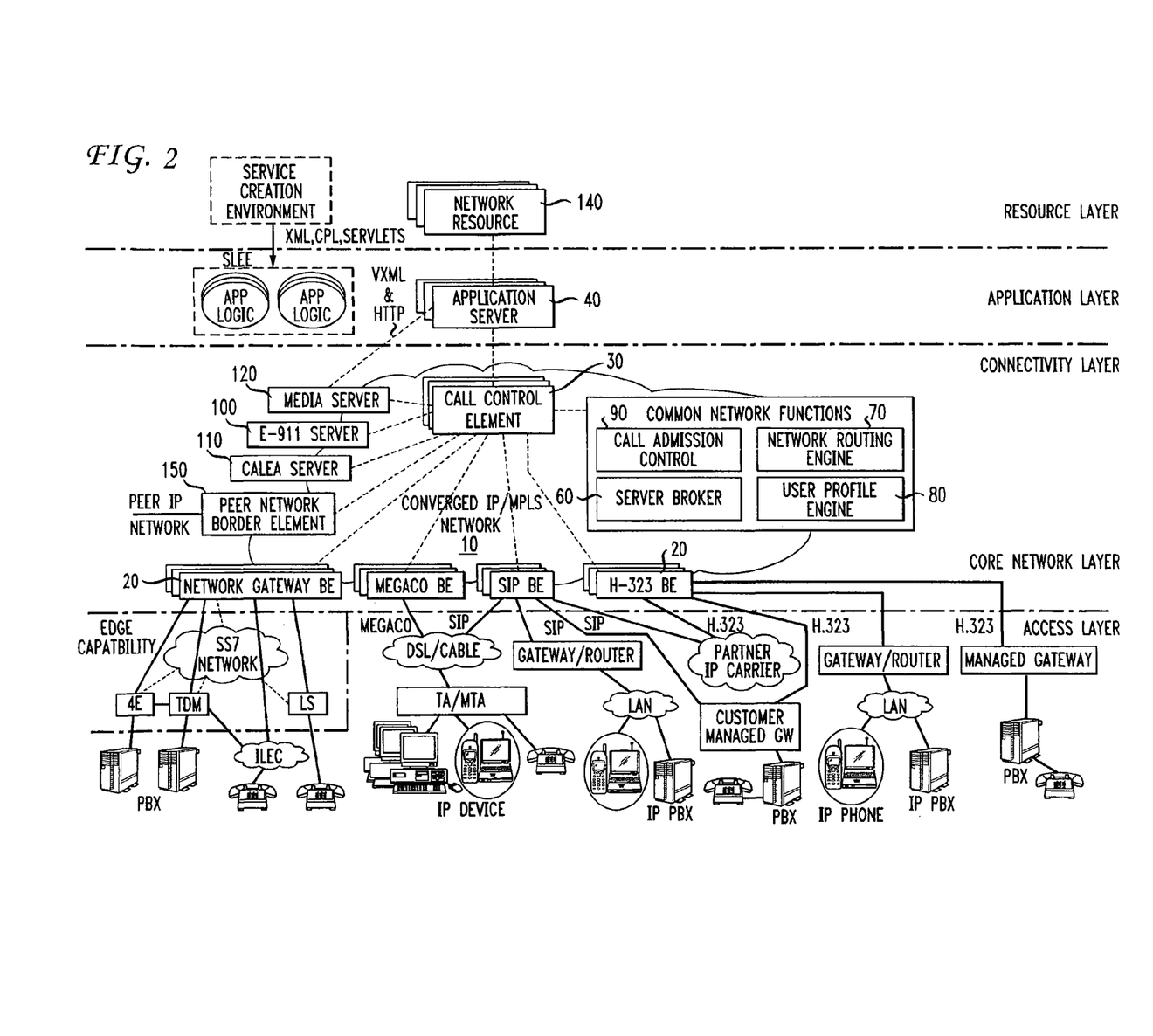
FIG. 2 is block diagram of Common Architecture and different access networking and access call control protocols.
Figure 3:
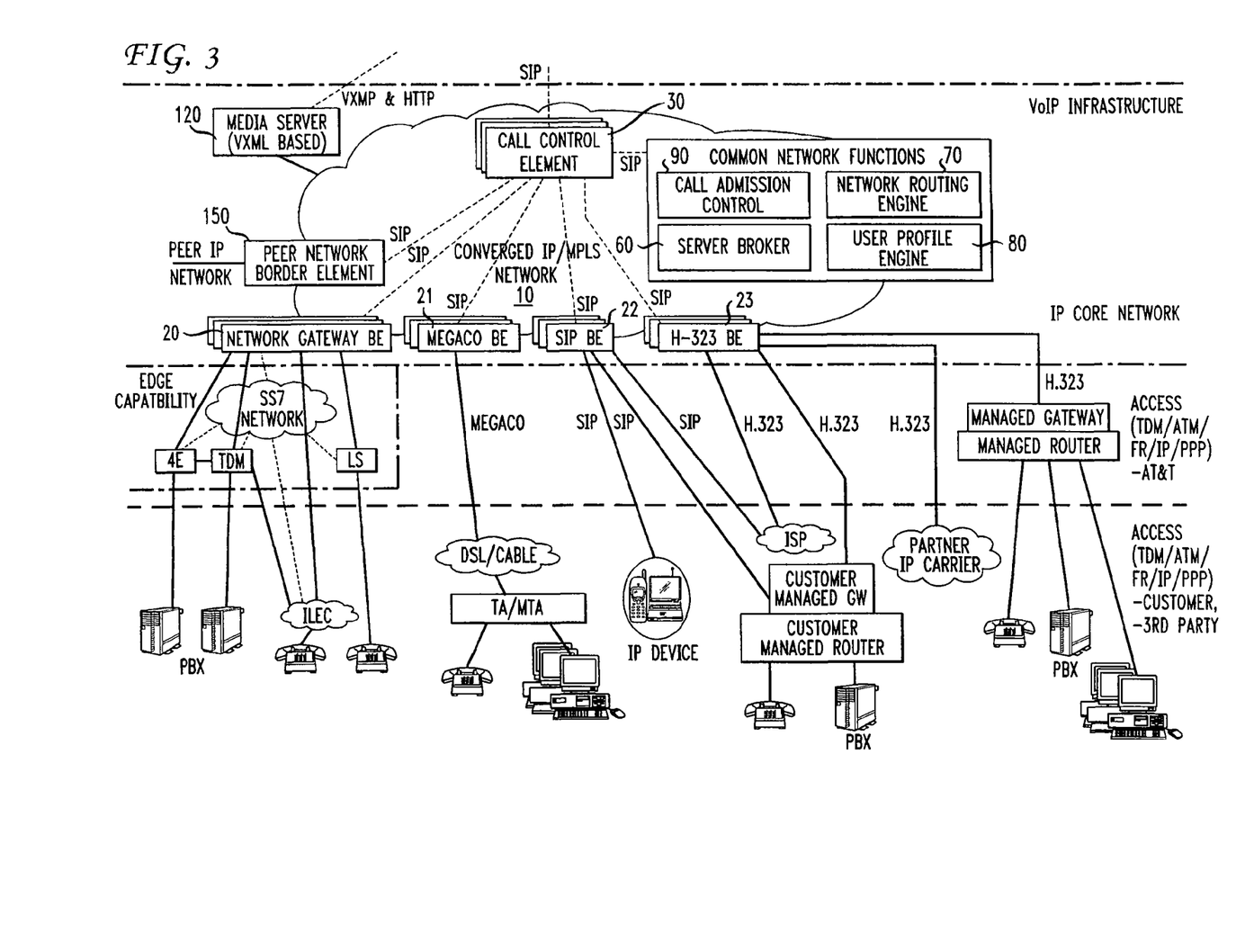
FIG. 3 is a block diagram of different access networking and access call control protocols connected to the Common Architecture.

Referring now to FIG. 2 and FIG. 3, a combination of the common architecture and the different access networking technologies with different call control protocols is shown (FIG. 2) as is the access networking technologies with different call control technologies (FIG. 3).

When an external access network is a TDM network, the TDM access technologies is terminated in a BE 20. The BE 20 converts the TDM access into an IP packet technology which uses MPLS for the IP packet forwarding. When an external access network is an ATM network, the ATM access is terminated in a BE. The BE converts the ATM access into IP packet technology which uses MPLS for the IP packet forwarding. Similarly, if an external access network is an FR network, the FR access is terminated in a BE. The BE converts the FR access into IP packet technology which uses MPLS for the IP packet forwarding. When an external access network comprises an Ethernet network, the Ethernet access is terminated in a BE. The BE will then terminate the Ethernet protocol and use the IP packet technologies which will use MPLS for the IP packet forwarding. When the external network is an IP external network, it will also terminate in the BE and the BE will use a new IP address over the IP/MPLS network although no access networking protocol conversion is required.

In such a manner, all access networking technologies are converted into IP/MPLS common networking technologies by the BE. However, these terminations and conversions are transparent to the external networking technologies. For example, if a communication entity uses the TDM access networking technology for communications with another entity which has the ATM access networking technology, both of these entities will be connected in separate BEs. However, the communications between the BEs that connect both parties using TDM and ATM access will be communicating over the common IP/MPLS network that is used by all entities including BEs of the Common Architecture as described in this invention.

Thus, the networking access technologies have, in effect, become transparent for communications among all communicating entities because of the Common Architecture. In other words, all external networking technologies will remain at the disposal of the end users as they wish depending on economies-of-scale of the existing legacy systems, emerging new access networking technologies, or in the technologies that may come in the future, and the end users do not need to worry about communicating with other users throughout the world irrespective of the technology being used. The Common Architecture defined in the present invention provides transparent communications among users of various access networking technologies.

With respect to the access call control protocols, the similar arguments as described above are also applicable. If a communicating party uses analog/ISUP call control protocol over the TDM access networking technology, the call will also terminate to the BE (e.g., Network Gateway BE 20). The ISUP call control protocol is converted into SIP call control protocol by the BE 22. The BE will then send the SIP messages to the CCE 30 to invoke the services that the end user connected over the TDM. The destination user may be using another (e.g., H.323, MEGACO, MGCP, SIP) or the same (i.e., analog/ISUP) call control protocol and the different (e.g., ATM, IP, FR, Ethernet) or the same (i.e., TDM) access networking technology.

When a user uses H.323 access call control protocol using any networking technologies (e.g., IP, ATM, FR, Ethernet, TDM) and the BE 23 (e.g., H.323 BE) will terminate the H.323 access call control protocol and will convert into SIP. The BE 23 will then send the SIP messages to the CCE 30 to invoke the services that the end user is using in the H.323 protocol. The destination user may be using another call control protocol (e.g., MEGACO, MGCP, SIP, analog/ISUP) or the same (i.e., H.323) call control protocol and the different or the same access networking technology as that of the caller. The same is true for MEGACO or MGCO or other call control protocols.

In the scenario wherein a user uses SIP access call control protocol using any networking technologies (e.g., IP, ATM, FR, Ethernet, TDM), the BE 22 (e.g., SIP BE) will terminate the SIP access call control protocol and will re-originate the SIP signaling messages, acting as a back-to-back-user-agent (B2BUA). The BE 22 will then utilize the SIP protocol. The destination user may be using another (e.g., MEGACO, MGCP, H.323, analog/ISUP) or the same (i.e., SIP) call control protocol and the different or the same access networking technology like that of the caller.

In such a manner, the Common Architecture 1 acts as access independent either for different networking technologies (e.g., TDM, ATM, IP, FR, Ethernet) and for different access call control protocols (e.g., H.323, MEGACO, MGCP, SIP).

Figure 4A:
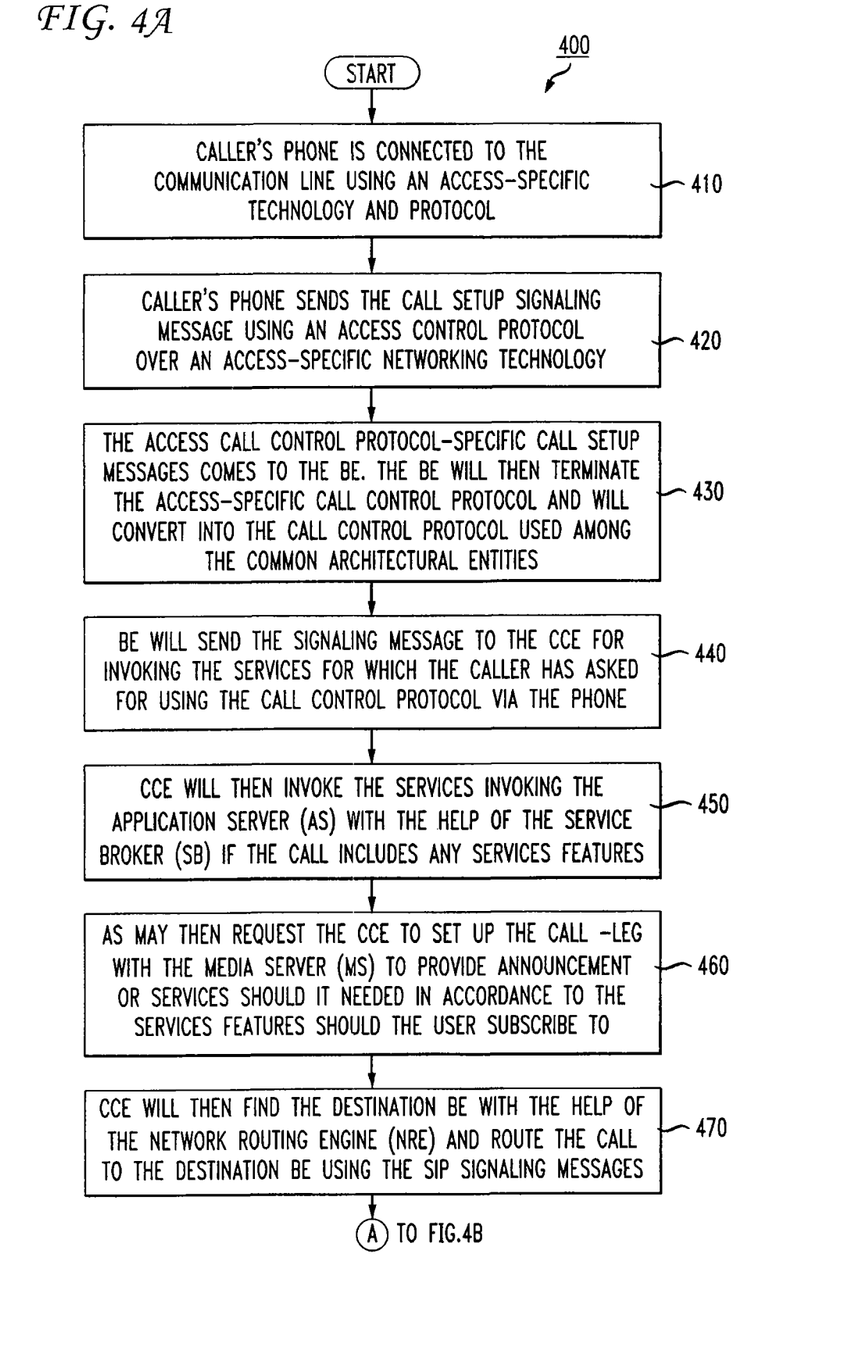
FIGS. 4A and 4B are a flow chart of a call flow utilizing the architecture of the present invention.
Figure 4B:
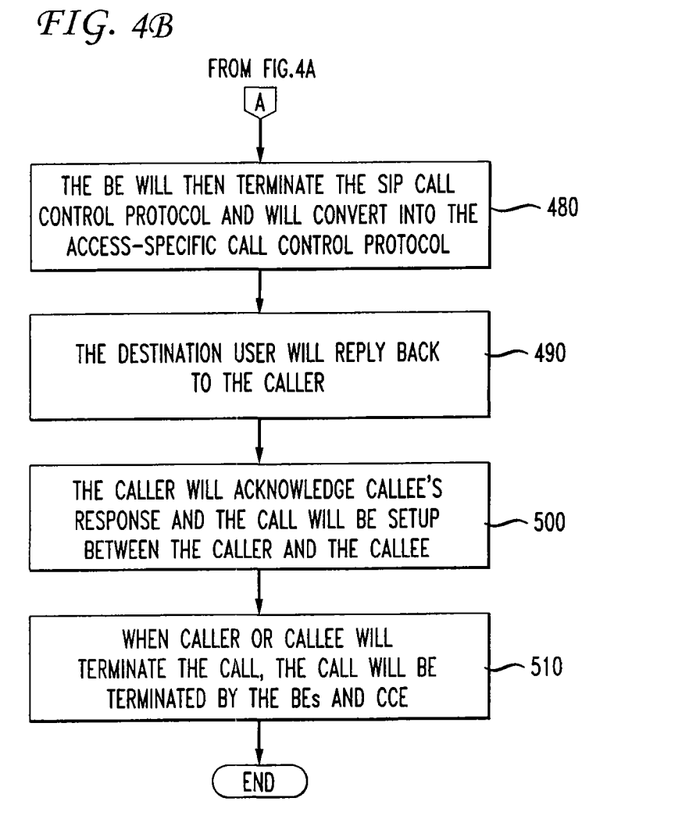

A flow chart of a basic call made using the presently disclosed architecture is depicted in FIGS. 4A and 4B. The rectangular elements are herein denoted "processing blocks" and represent computer software instructions or groups of instructions.

Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 4A and 4B, the process 400 for providing an access independent common architecture for communication services for networking environments is shown. The process 400 starts and processing block 410 is executed wherein a caller's phone is connected to a communications line using an access-specific networking technology (e.g., TDM, ATM, FR, IP, Ethernet) and an access-specific call control protocol (e.g., analog/ISUP, H.323, MEGACO, MGCP, SIP).

Processing block 420 is executed next. In processing block 420 the caller's phone sends the call setup signaling message using an access call control protocol over an access-specific networking technology.

The access call control protocol-specific call setup messages comes to the BE, as shown in processing block 430. The BE terminate the access-specific call control protocol and converts into the call control protocol (SIP) used among the Common Architectural entities. When the access call control protocol is SIP, the BE will re-originate the SIP signaling message acting as the SIP back-to-back-user-agent (B2BUA). The access networking technology-specific (e.g., TDM, ATM, FR, Ethernet) communications link is connected to the BE, and the BE converts this into IP/MPLS networking technology. When the IP becomes the access protocol, the BE terminates the access IP addresses and re-originates the IP packets into IP/MPLS that is used by the Common Architecture In processing block 440, the BE sends the SIP signaling message (e.g., INVITE) to the CCE for invoking the services for which the caller has asked for using the call control protocol via the phone. Next, as shown in processing block 450, the CCE invokes the services invoking the application server (AS) with the help of the service broker (SB) if the call includes any services features. All of them will use the SIP signaling messages for communicating among themselves.

Processing block 460 recites that the AS may then request the CCE to set up the call-leg with the media server (MS) to provide announcement or other services in accordance to the services features subscribed to by the user. When the services of the MS is finished, the AS directs the CCE to route the call to the destination user.

In processing block 470, the CCE finds the destination BE with the help of the network routing engine (NRE) and routes the call to the destination BE using the SIP signaling messages.

Processing block 480 is executed next, wherein the BE terminates the SIP call control protocol and converts it into the access-specific call control protocol. If the access call control protocol is SIP, the BE will re-originate the SIP signaling message acting as the SIP back-to-back-user-agent (B2BUA). The access call control protocol-specific call setup messages are sent to the destination user's phone. The BE converts the IP/MPLS networking technology into the access networking technology-specific (e.g., TDM, ATM, FR, Ethernet) communications line connecting the destination user phone. When the IP becomes the access protocol, the BE terminates the access IP addresses and re-originates the IP packets from IP/MPLS into the IP access network connecting the destination user phone.

Next, as shown in processing block 490, the destination user replies back to the caller. The response signaling messages from the callee go back to the caller in a similar way as described for the call setup request messages. All signaling messages go via the BEs and the CCE and AS via the pre-defined route.

The caller acknowledges the callee's response and the call is setup between the caller and the callee, as shown in processing block 500. The signaling message path for the first call-leg setup for announcement: Caller's phone <-> BE <-> CCE <-> MS (Note: AS is not shown for simplicity). When announcement is finished, the call signaling messages flow using the path: Caller's phone <-> BE <-> CCE <-> BE <-> Callee's phone. (Note: AS is not shown for simplicity). The media will flow using the following path for the first call-leg: Caller's phone <-> BE <-> MS Caller's phone <-> BE <-> BE <-> Callee's phone (Note: Media does not pass through the CCE or AS).

In processing block 510, when the caller or the callee terminates the call (i.e., say BYE), the call is e terminated by the BEs and CCE. The process then ends.

This present invention fulfills an important need in the industry, namely a single common infrastructure for offering real-time communications services over a large-scale network independent of any call control protocols and networking technologies. The present invention allows the building of a large-scale network that will provide interoperability in multi-vendor and multi-protocol environment, and further provides the scalability and economies-of-scale for building a large-scale network that spans across the globe for offering the real-time communications services without duplicating functions.

Having described preferred embodiments of the invention it will now become apparent to those of ordinary skill in the art that other embodiments incorporating these concepts may be used. The software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A method of placing a call, comprising:
receiving a call request to a destination phone number from a caller phone at a first border element, wherein the caller phone is connected to the first border element using a time division multiplexing technology;
forwarding the call request from the first border element to a call control element, wherein the first border element communicates with the call control element using a session initiation protocol, wherein the call control element only communicates in the session initiation protocol, wherein the call request is for being sent via the call control element to a second border element connected to a destination phone, wherein the second border element is selected from a plurality of second border elements, wherein the plurality of second border elements comprises a session initiation protocol to H.323 border element, a session initiation protocol to a media gateway control protocol border element, a session initiation protocol to a media gateway control border element, a session initiation protocol to a signaling system 7 protocol border element, a session initiation protocol to a central authentication service protocol border element and a session initiation protocol to an integrated services digital network protocol border element;

establishing the call between the caller phone and the destination phone;

receiving, by the first border element, a hangup message sent from the destination phone, wherein the receiving the hangup message sent from the destination phone comprises receiving a bye command sent from the second border element via the call control element; and disconnecting the caller phone from the first border element.

2. The method of claim 1, wherein the forwarding the call request from the first border element to the call control element comprises sending an invite command to the call control element.

3. The method of claim 1, wherein the call request being sent via the call control element to the second border element comprises sending an invite command to the second border element.

4. The method of claim 1, wherein the establishing the call between the caller phone and the destination phone comprises at least establishing communications between the caller phone and the first border element.

5. The method of claim 1, wherein the receiving the hangup message sent from the destination phone comprises receiving a bye command sent from the second border element via the call control element.

* * * * *